United States Patent Office 2,701,922
Patented Feb. 15, 1955

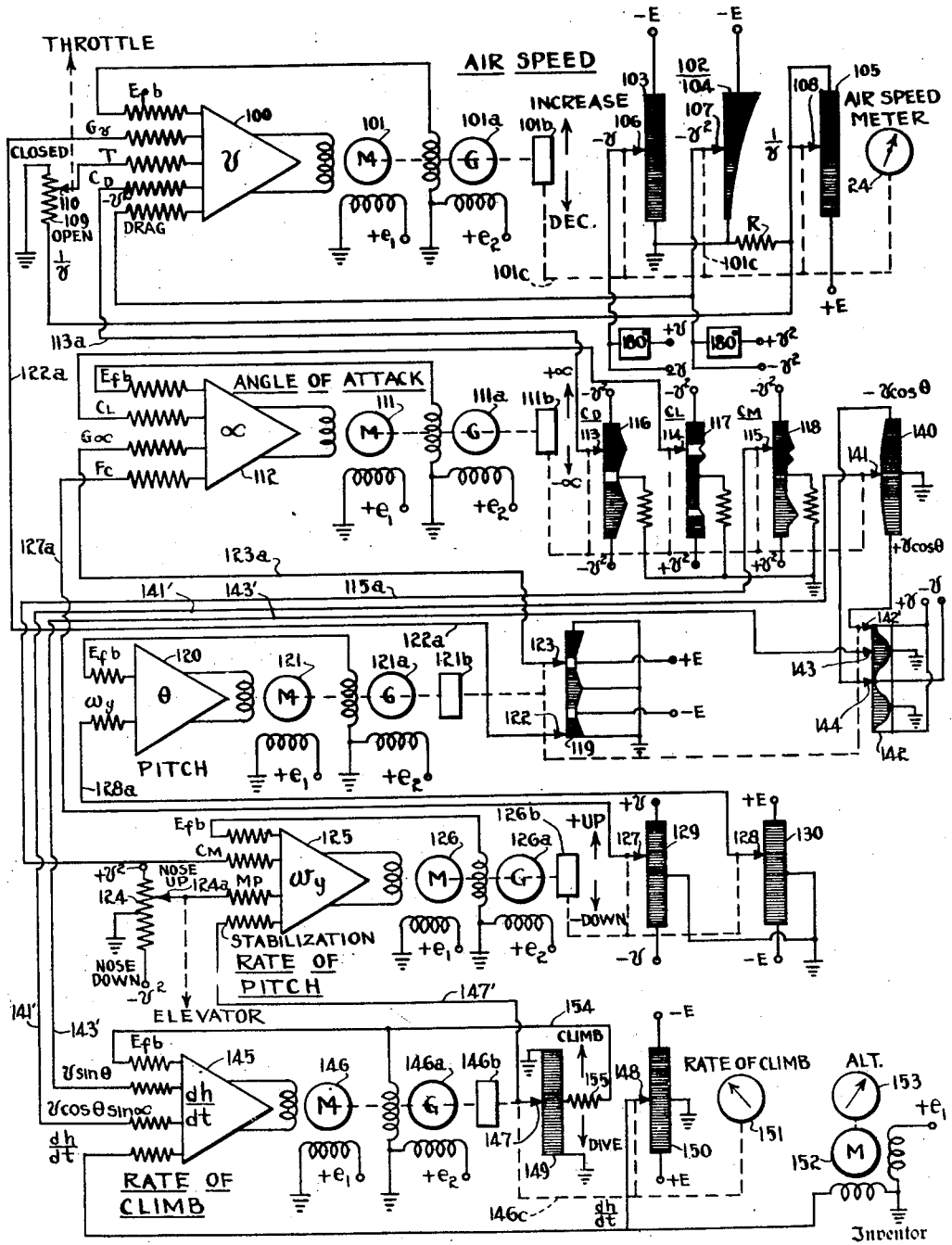

2,701,922

FLIGHT SIMULATING MEANS WITH STABILIZING CONTROL

Richard C. Dehmel, Short Hills, N. J.

Application May 7, 1951, Serial No. 224,951

14 Claims. (Cl. 35—12)

This invention relates to flight computing systems for representing various flight conditions, and in particular to electronic computing systems of the interacting servo type responsive to the operation of simulated aircraft controls.

Flight computing systems of the aforesaid electronic type have been developed for realistically translating the movements of simulated aircraft controls into flight and navigation instrument readings. A system of this character is disclosed by my co-pending application, Serial No. 429,314 filed May 12, 1954 as a continuation of Serial No. 777,414 filed October 2, 1947, now abandoned, for "Flight Computing System and Apparatus." The instrument readings or indications of such apparatus particularly when used for training purposes, should reflect the flight characteristics of the aircraft that is simulated, especially with respect to the vertical system involving climb and dive rates. For example, in actual flight the stick may be accidentally moved so as to position the elevator momentarily at a climb or dive attitude. Assuming that the aircraft was previously in level flight and that the trim is properly set, the aircraft should by itself promptly recover and straighten out on its original course. Such inherent stability should also be present to a realistic degree in flight simulating or training apparatus.

A principal object, therefore, of the present invention is to provide improved flight computing apparatus that functions so as to take into account aircraft characteristics of this nature, and especially stabilizing characteristics involving the vertical control system.

A further object of the invention is to provide improved means for stabilizing the operation of pitch and rate of climb servo systems of electronic flight computing apparatus for representing pitch and altitude.

In accordance with the present invention, a flight computing system such as that disclosed in my aforesaid application, Serial No. 429,314, is provided with means for deriving a control quantity, such as a control voltage, corresponding to a function of rate of climb or vertical air speed and this quantity is in turn used as an input control quantity for means representing rate of pitch whereby the complete vertical system representing factors such as air speed, rate of pitch, angle of attack, pitch attitude, etc., is stabilized so as to react realistically for all simulated conditions of climb and dive.

Referring to the drawing, the single figure thereof is a diagrammatic illustration of a simplified vertical air speed interacting servo system embodying the present invention.

Since the illustrated embodiment of the invention is concerned with vertical air speed, it is unnecessary to describe in the present specification a lateral or "yaw system" including factors such as yaw, roll and sideslip.

A so-called "vertical system" involving only elevator and throttle control for computing air speed will first be described. According to well-known principles of aerodynamics, air speed ($v$) is a function of engine thrust (T) which is always positive (except for propeller drag when idling in flight below about 1200 R. P. M.), gravity (G) which may be either positive or negative depending on whether the aircraft is in a dive or climb, and drag which is of course negative. Drag may be considered as having two components, constant coefficient drag which varies as the square of the air speed $v^2$, and another drag expressed by the variable coefficient $C_D(\alpha)$ which varies with the angle of attack ($\alpha$), i. e., the angle between the chord of the wing and the air stream.

Referring now to the drawing, it will be assumed that a plurality of A. C. voltages representing various values of thrust, gravity and drag respectively, according to the instantaneous polarity and magnitude of the respective voltage are fed separately into a summing amplifier diagrammatically indicated at 100 included in a servo system designated "air speed." Such amplifiers are well known in the art for algebraically summing a plurality of separate A. C. voltages of varying magnitude and polarity. The output of the amplifier 100 is used to control an automatic balancing servo network including a two-phase motor 101, the control phase of which is energized by the amplifier output as illustrated and the other phase by a constant reference A. C. voltage $+e_1$. The operation of this type of motor is well known, the rotation being in one direction when the control and reference voltages in the respective phases have the same instantaneous polarity, and in the opposite direction when the instantaneous polarity of the control voltage is reversed with respect to the reference voltage, the rate of rotation in both cases depending on the magnitude of the control voltage. The motor drives a two-phase feedback generator $101a$ also having one phase energized by an A. C. reference voltage $+e_2$, the other phase generating according to the motor speed a feed-back voltage $E_n$ for purposes of rate control hereinafter described. The motor also serves to gang-operate through a gear reduction train $101b$ the contacts of a potentiometer system generally indicated at 102; also the pointer of the air speed meter 24 is directly positioned through the motor drive mechanism, suitable mechanical connections $101c$ between the motor and the driven elements being indicated by dotted lines.

The individual potentiometer resistance elements, referring now to the drawing may be of the well-known wound card type and are of circular or band form but are diagrammatically illustrated in a plane development for clearness. Each potentiometer is shaped or contoured so that the value of the derived voltage at the potentiometer contact bears a certain relationship to the linear movement of the slider contact depending on the particular function of the potentiometer, and has a voltage impressed across its terminals depending in instantaneous polarity and magnitude also on the function of the potentiometer. According to the present invention the contour of all functional potentiometers represents the derivative of the function represented. For example, the potentiometers 103 and 105 are of the linear type whereas the potentiometer 104 is contoured to represent a relationship $x=y^2$, where $x$ represents the linear movement of the contact and $y$ represents the derived potentiometer voltage, in the present instance air speed squared.

Stated more specifically, the contour or width variation of the various potentiometers used to derive voltages simulating aircraft characteristics is proportional to the derivative of the function of the respective characteristic with respect to the variable represented by the setting of the potentiometer. For example, let it be assumed that the function is a linear one as where a derived voltage is to be directly proportional to the distance that the servo operated potentiometer contact is from a zero position. The slope of the function curve then is the constant ratio of derived voltage to increase in the independent variable represented by the contact travel from the zero position. The derivative of this relationship is the same for all contact settings so that the width of the card is uniform, making it rectangular in shape. If now the function varies according to a square law such as $x=y^2$ the derivative of this equation $f(x)=2y$ determines the width of the potentiometer. Therefore the potentiometer has a straight line sloping edge giving it a wedge shape.

In another case where a cosine function is involved, the derivative or slope of the cosine curve may be expressed as $$\frac{d(\cos\theta)}{d\theta}=-\sin\theta$$

where $\theta$ is the angle measured in radians. Accordingly, the contour of the potentiometer card for corresponding values of $\theta$ is sine shaped, the negative value being taken care of by corresponding selection of the polarity applied to the potentiometer. Conversely where a sine function is involved the potentiometer card for corresponding values of $\theta$ will have a cosine contour.

Referring again to the drawing, the potentiometer 104 is energized at its upper terminal representing maximum air speed by a negative voltage $-E$ and is grounded at its lower end so that the derived voltage at the slider contact 107 represents $-v^2$ and therefore is also representative of the constant coefficient drag previously referred to. Accordingly, this voltage may be used as one of the inputs of the air speed summing amplifier 100 tending to oppose the positive thrust voltage (T), the arrangement being such that when the effect of all input voltages to the amplifier balance out, i. e. during a period of no change in air speed, the output of the amplifier is zero and the motor 101 is de-energized. Any change in the input voltages tending to unbalance the system, either in a positive or negative direction, such as for example in level flight during a change in throttle setting when the thrust and drag voltages are unequal, causes operation of the motor 101 in a corresponding direction to move the potentiometer contacts toward a new balance position wherein newly derived voltages tend to restore balance of the motor inputs.

For the purpose of deriving a voltage proportional to air speed $v$, the linear potentiometer 103 is energized by a voltage $-E$ and the slider contact 106 is positioned according to the magnitude of air speed. This derived voltage is used in another part of the system to be described.

The thrust voltage is shown as derived from the setting of the engine throttle potentiometer 109, the contact 110 of which is directly adjusted by the pilot to simulate throttle control. This potentiometer is energized by a voltage taken from the contact 108 of potentiometer 105 that is also energized at its lower terminal by a voltage $+E$, the upper terminal being grounded through a resistance R and also directly connected to contact 108 for deriving a voltage proportional to the reciprocal of air speed $$\frac{1}{v}$$

so as to correspond with the relationship $$T = \frac{\text{H. P.}}{v}$$

which is simply the basic equation $$\text{H. P.} = \frac{\text{ft.-lb.}}{\text{sec.}} = vT$$

It will therefore be seen that the thrust input voltage corresponds generally to the delivered engine power as determined by throttle setting and air speed.

The drag coefficient input $C_D$ varies, as above indicated, with the angle of attach $\alpha$. Accordingly another servo system designated "angle of attack" is provided for deriving a set of voltages corresponding to certain factors variable with angle of attack. A two-phase motor 111 (similar to motor 101) of the angle of attack system is energized by the output of a summing amplifier 112 in the manner above described for driving a feed-back generator 111a and for gang-operation of the contacts 113, 114 and 115 of potentiometers 116, 117 and 118 respectively. These potentiometers are for the purpose of calculating the drag coefficient $C_D$, the lift coefficient $C_L$ and the moment coefficient $C_M$ respectively.

In addition to the aforesaid potentiometers, another potentiometer 140 is provided in the angle of attack servo system for the purpose of calculating a component of vertical air speed for purposes hereinafter described. The slider contact 141 of this potentiometer is gang operated as indicated with the other contacts 113, etc. The potentiometer has a grounded center tap and is energized at its opposite terminals by voltages representing a combined function of air speed and pitch attitude derived from the pitch servo system presently described.

The inputs of the $\alpha$ amplifier 112 include voltages representing gravity, the lift force ($C_L$) and centrifugal force ($F_c$) due to pitching. These inputs will be explained shortly.

The drag as related to angle of attack may be expressed as $$D = C_D(\alpha) \rho \frac{v^2 S}{2}$$

where D is the drag in pounds, $\rho$ is the density of air, $C_D(\alpha)$ is the drag coefficient and S is the projected wing area. Therefore drag is a function of $v^2$, i. e., air speed squared. For representing this relationship the potentiometer 116 is appropriately contoured and energized at its opposite terminals by a voltage $-v^2$ taken from the potentiometer 104 of the air speed system. The mid-part of potentiometer 116 is grounded at the angle of attack where the drag coefficient $C_D(\alpha)$ is zero and contact 113 is connected by conductor 113a to the air speed amplifier 100. Accordingly, the derived voltage at contact 113, since it varies with change in angle of attack generally according to the above relationship can be used as an input $C_D$ to the air speed amplifier. The gravity input (G) depending on the pitch of the aircraft involves additional servo systems that will be presently described.

The inputs to the angle of attack ($\alpha$) amplifier 112 will now be considered. The gravity factor which as above pointed out is affected by climb and dive attitudes may be divided into two components which are fed to the angle of attack and air speed amplifiers 112 and 100 respectively. In practice these gravity inputs are 90° components, i. e. the air speed component is along the flight path and the angle of attack component is perpendicular thereto. In the present illustration the $v$ and $\alpha$ gravity components are derived by a pair of contacts 122 and 123 from the potentiometer 119 of the "pitch" ($\theta$) servo system indicated, the pitch amplifier 120 in turn being energized to operate the motor 121, etc., from a "rate of pitch" system presently described. The pitch potentiometer 119 is suitably contoured (cosinusoidal in the present instance) and grounded at points 180° apart to represent both normal and inverted level flying, and the potentiometer is energized at points intermediate the grounded points by voltages $-E$ and $+E$ representing climb (negative) and dive (positive) gravity values respectively. The derived voltage at contact 122 represents the gravity component $-W \sin \theta$ which (at low angles of attack) represents the effect of aircraft weight in increasing or decreasing thrust and hence air speed, and is fed by conductor 122a to the $v$ amplifier 100. The derived voltage at the contact 123, which is spaced 90° from contact 122 represents the gravity component $W \cos \theta$ to be supported by lift derived through angle of attack and is fed by conductor 123a to the $\alpha$ amplifier 112.

The pitch servo system also includes a cosinusoidal potentiometer 142 that is energized as indicated according to airspeed for deriving at the 180° spaced slider contacts 142' and 144 oppositely phased component voltages $+v \cos \theta$ and $-v \cos \theta$ respectively. These voltages are used to energize the angle of attack potentiometer 140 previously referred to so that the resulting derived voltage at contact 141 represents a component of vertical air speed, namely, $v \cos \theta \sin \alpha$. This voltage and the voltage $v \sin \theta$ derived from the pitch potentiometer 142 at contact 143 are led by conductors 141' and 143' respectively to a "rate of climb"

$$\left(\frac{dh}{dt}\right)$$

system hereinafter described. The resultant of these two voltages, namely $v \sin \theta - v \cos \theta \sin \alpha$, represents the vertical air speed vector $v \sin (\theta - \alpha)$ as can be readily demonstrated, assuming $\alpha$ to be small.

Referring again to the angle of attack system, the lift L (in pounds) may be expressed by the formula $$L = C_L(\alpha) \rho \frac{v^2 S}{2}$$

where $C_L(\alpha)$ is the coefficient of lift. Therefore lift also is a function of air speed squared and depends on the type of aircraft simulated. Accordingly the potentiometer 117 of the $\alpha$ system for determining lift coefficient is appropriately contoured for the coefficient $C_L(\alpha)$ of the particular airplane simulated and is grounded at its mid-portion at the value of angle of attack at which the lift coefficient is zero and energized at its upper and lower terminals by voltages $-v^2$ and $+v^2$ respectively derived from the air speed potentiometer 104. The instantaneous positive value of $v^2$ may be suitably obtained by means of a 180° phase shifter as indicated. Accordingly the contact 114 of the potentiometer 117 derives a lift force voltage which is applied as an input to the α amplifier 112. There is also an input to the angle of attack system representing centrifugal force and this input is derived from the servo system designated "rate of pitch" ($\omega_y$), centrifugal force corresponding to the product of $\omega_y$ and $v$.

The inputs to the rate of pitch system include a so-called pitching moment input derived from the potentiometer 118 of the angle of attack system. This pitching moment expressed as $$C_M(\alpha)\rho\frac{v^2 S}{2}$$

is also a function of air speed squared. The potentiometer 118 is grounded at its mid-portion at the angle of attack where the pitch moment is zero and is energized by voltages $-v^2$ and $+v^2$ as in the case of potentiometer 117, and is also appropriately contoured so that the pitching moment voltage at the slider contact 115 varies according to the desired characteristics of the particular airplane. This voltage is fed by conductor 115a to amplifier 125. The other input $M_D$ of amplifier 125 indicated represents the pitching moment in ft.-lbs. produced by the pilot operated elevator control tending to cause pitch and is derived from the elevator potentiometer 124 that is in turn energized according to the square of air speed by voltages $+v^2$ and $-v^2$. The mid-portion of the potentiometer is grounded to represent approximately level flying or zero pitch. Accordingly the slider contact 124a of the elevator potentiometer selects a voltage that may be represented as the pitching moment ($M_D$) in foot-pounds and that is fed to the rate of pitch amplifier 125. It is to be noted that in the case of the foregoing circuits a positive (+) designated signal increases air speed, changes angle of attack, rate of pitch and pitch in the conventionally positive direction. In addition to the aforesaid inputs for the rate of pitch system, a voltage derived from the "rate of climb"

$$\left(\frac{dh}{dt}\right)$$

system above referred to and representing a stabilization factor is fed to the amplifier 125. This factor will be considered later in more detail in connection with the rate of climb system.

As in the previous servos, the output of amplifier 125 energizes a two-phase motor 126 for driving a feed-back generator 126a and the contacts 127 and 128 of potentiometers 129 and 130 through a suitable speed reducing mechanism 126b. The linear potentiometer 129 is used to derive an input voltage representing centrifugal force for the α amplifier and is therefore grounded at its mid-portion and energized according to air speed by voltages $+v$ and $-v$ so that the derived voltage at the slider contact 127 is determined as previously stated by the factors $v$ and $\omega_y$ and fed to the α amplifier by conductor 127c. Also the linear potentiometer 130 for supplying an input to the pitch ($\theta$) integrating system above referred to is energized by voltages $+E$ and $-E$ whereby the derived voltage at the slider contact 128 which is fed by conductor 128a to the $\theta$ amplifier is proportional to the rate of pitch, the time integrated value of which represents the pitch angle $\theta$ of the aircraft. This integrating operation is performed by means of the pitch motor 121 and feedback generator 121a, the potentiometer 119 above described providing voltages at slider contacts 122 and 123 that not only represent the two gravity components above referred to but also the instant angle of pitch. Accordingly the pitch element of an attitude gyro can be directly operated from the pitch motor 121 if desired.

It is also to be noted that the variation in the various forces and moments such as gravity, lift, centrifugal force, thrust, drag, pitching moment and the like are accomplished by the change in contact brush position on the respective potentiometers together with variation in the potentiometer energizing voltage, whereas the relative magnitude of each of the aforesaid forces and moments is determined by the value of the input resistance to the various amplifiers. As a specific example, the relative magnitude of lift is affected by the values of air density ($\rho$) and the constant factor $$\frac{S}{2}$$

In the present illustration $\rho$ is also considered a constant and hence these terms determine the resistance value of the input indicated at $C_L$ to the amplifier 112. Lowering the value of the resistance increases the relative magnitude of the above constant.

Referring now to the rate of climb $$\left(\frac{dh}{dt}\right)$$

system, the servo amplifier 145 is connected to the servo motor 146 for driving the feed back generator 146a and the slider contacts 147 and 148 of the respective potentiometers 149 and 150 through a gear box 146b. An indicator 151 representing rate of climb is also mechanically connected as indicated at 146c to the contact drive means.

The inputs to the rate of climb amplifier 145 include the vertical air speed component voltages $v \sin \theta$ and $v \cos \theta \sin \alpha$ above referred to, the summation of which represents the vertical air speed vector, and an "answer" voltage $$\frac{dh}{dt}$$

from the potentiometer 150. This potentiometer has a grounded center tap to represent level flight and is energized by oppositely phased voltages as indicated so that the derived voltage at contact 148 represents dive or climb rate.

Since the time integration of rate of climb is altitude, the voltage $$\frac{dh}{dt}$$

can also be used to operate an integrating motor 152 that is connected through suitable reduction gearing (not shown) to an indicator 153 representing altitude. The motor 152 is of the reversible two-phase type as above described for operation according to representations of dive or climb.

The stabilization factor potentiometer 149 is designed to derive a voltage representing the first derivative of rate of climb, i. e., the second derivative of altitude, for feedback input to the rate of pitch servo. The stabilization factor therefore represents acceleration and is zero only during a stable condition. The purpose of this feedback is to improve the stability of the vertical system and eliminate hunting with respect to the objective or desired flight path. Specifically, the potentiometer 149 is grounded at its end terminals and is energized at its center terminal by a velocity voltage from the feed-back generator 146a, the energizing circuit from the generator winding including conductor 154 and a proportioning resistance 155. The derived voltage at contact 147 which is lead by conductor 147' to the rate of pitch amplifier 125 is opposite in polarity to the elevator derived voltage $M_p$ and tends to restore the pitch servo to its original position.

The use of the feed-back generators for rate control is particularly important, the pitch servo integrating system serving as an important example. If the motor 121 alone were relied upon to perform the pitch integrating operation the natural inertia of the driving mechanism would introduce such a large error that from a practical standpoint the system would not be useful. However, with the feed-back generator connected in the system as shown, the generated feed-back voltage $E_{fb}$ constitutes an input for the pitch amplifier and is of such phase relation to the summed or resultant input signal that it opposes the same, i. e. in the manner of degenerative or negative feedback. With large gain in the control amplifier the speed of the motor according to well-known principles is therefore caused to have a linear speed response to the magnitude of the input signal, i. e. rate of pitch voltage, without lag or overshooting, thereby integrating both high and low rates of pitch with equal precision. It will be apparent that when the main input signal is reversed so as to operate the motor and generator in the opposite direction, the phase of the generated feed-back voltage is likewise reversed to oppose the input signal as before.

The operation of the interacting network in respect to the air speed meter reading will now be described. In actual level flying for example when the throttle is opened wider the air speed increases and the nose of the aircraft lifts, the converse taking place during closing of the throttle. Referring to the drawing, as the throttle potentiometer contact 110 is moved downward for example toward the open throttle position, the derived input thrust voltage T for the amplifier 100 increases thereby unbalancing the air speed servo system and causing the servo motor 101 to run in a direction moving the potentiometer contacts 106, 107 and 108 upward as shown toward increased air speed so that the following takes place in the air speed potentiometer system 102: (1) the derived air speed voltage $v$ increases, (2) the derived $v^2$ voltage increases as the square of air speed, (3) the derived voltage representing the reciprocal of air speed $$\frac{1}{v}$$

decreases and (4) the air speed meter 24 indicates a higher air speed value. However the air speed cannot increase indefinitely because the constant coefficient drag increases with $v^2$ as does the $C_D(\alpha)$ drag. Also at the same time the thrust, which varies with the reciprocal of air speed, decreases as the new equilibrium is reached.

Now, as the values of both $v$ and $v^2$ increase, the angle of attack system is in turn unbalanced since the inputs from the potentiometer 127 of the rate of pitch system and from the potentiometer 117 of the angle of attack system, both of which are dependent on $v$ and $v^2$ respectively, are now increased. Also the gravity input from the pitch system is changed as will presently be described. Accordingly, the $\alpha$ servo 111 starts running in a direction searching for a new balance position and finally moving the potentiometer contacts 113, 114 and 115 downward toward decreased angle of attack indication. As this operation progresses the derived voltages from the three $\alpha$ potentiometers 116, 117 and 118 are used as follows:

(1) The derived drag voltage (negative) from potentiometer 116 is used as an input ($C_D$) for the air speed amplifier and increases in magnitude so as to oppose the increased thrust voltage (positive) derived from the higher throttle setting above referred to.

(2) Since the wing lift of an aircraft must balance any centrifugal force and weight component acting perpendicular to the wing, the derived lift voltage ($C_L$) from potentiometer 117 must balance both the gravity factor $G_\alpha$ and the centrifugal force $F_c$. Assuming that the plane was initially in level flight, the centrifugal force is zero and hence the tendency of increased air speed is to reduce the angle of attack which will tend to become more negative. This tendency is opposed by a change in pitching moment.

(3) The derived moment voltage from potentiometer 118 which is an input ($C_M$) for the rate of pitch amplifier, becomes more positive with decreasing angle of attack and thereby causes an unbalance at the rate of pitch servo system in turn causing the contacts 127 and 128 to move upward to select at contact 127 a centrifugal force voltage $F_c$ for the amplifier 112 which produces an equilibrium restoring tendency at the $\alpha$ servo. Concurrently the upward movement of contact 128 results in an increased input voltage at the pitch integrating servo system $\theta$. Accordingly, all four servo systems are now functioning in a combined computing and integrating operation necessary to determine the new air speed reading and pitch attitude.

As the pitch system is unbalanced toward a position of more positive pitch, i. e. climb, the derived voltages at contacts 122 and 123 representing the gravity (weight) input components for the $v$ and $\alpha$ amplifiers respectively vary in magnitude, the $v$ component increasing and the $\alpha$ component decreasing in the present instance as it will be apparent that if the aircraft nose were pointed toward the zenith the weight component in the direction of aircraft movement would then represent $-W$ and the weight component perpendicular to the wings, i. e. the $\alpha$ servo component, would be zero. At intermediate aircraft attitudes the components are vectorially resolved.

The negative weight component ($-W \sin \theta$) to the air speed servo tends to reduce the maximum velocity the aircraft will reach with the increased throttle setting. At the same time the wing lift required is decreased due to decrease of the $W \cos \theta$ value ($G_\alpha$) at the $\alpha$ amplifier 112. This allows a further reduction in angle of attack and additional reduction in the negative pitching moment voltage ($C_M$) to the rate of pitch amplifier 125 which in turn produces a still greater upward movement of the contacts 127 and 128, thus increasing the effect on the pitch and angle of attack servos until finally these servos have overrun and have produced too great a change in the weight components for equilibrium. Consequently there is dropping off of air speed. This in turn results in a decreased lift voltage ($C_L$) at the $\alpha$ amplifier 112 so that the angle of attack is increased and a larger negative pitching moment voltage is produced at potentiometer 118 for the $\omega_y$ amplifier 125. The $\omega_y$ contacts 127 and 128 now move downward to control the pitch integrating servo so as to reduce the pitch attitude until it finally becomes negative. The $W \sin \theta$ component ($G_V$) to the air speed servo has now become positive, thereby aiding thrust so that the air speed once more increases and the cycle reverses eventually damping itself to a final equilibrium position consistent with the new throttle setting.

In the foregoing manner the true damped wave path for vertical oscillation of an aircraft is accurately reproduced so that the simulation achieved is highly realistic. The degree of damping of the wave path is dependent on the choice of the circuit constants including percentage of velocity feed-back, gear ratios, relative input magnitudes and the positions of potentiometer center taps.

Because of this vertical oscillation due initially to "nosing up" of the aircraft in response to opening of the throttle, there will of course be indications of vertical airspeed, depending primarily on the airspeed and pitch attitude as represented by potentiometer 142 of the pitch system. As previously pointed out, the derived voltage $v \sin \theta$, which represents a vertical vector, is modified by angle of attack at potentiometer 140 so that the resulting derived voltage represents $v \cos \theta \sin \alpha$ and this voltage is in turn subtracted from the pitch derived voltage at amplifier 145 to represent the actual vertical component. The rate of climb motor 146 is operated according to this resultant voltage which in turn causes operation of the potentiometers 149 and 150 and the rate of climb and altimeter indicators 151 and 153 in the manner above described. The stabilization voltage from the potentiometer 149 tends further to damp the vertical oscillation above referred to since it is polarized so as to oppose the elevator moment and hence tends to dampen pitch.

It has been assumed during the above explanation that the throttle setting only has been changed and that the elevator control remained in normal level flight or neutral position. When the elevator control is adjusted, a derived voltage corresponding to the turning moment is used for controlling a rate servo, i. e. the rate of pitch servo from which is derived a voltage corresponding to centrifugal force. This force voltage is an input controlling the angle of attack servo for deriving a rate input voltage of opposite sense but equal in magnitude to the first moment voltage. Also, this same force voltage controls the derivation of another input force voltage representing lift which has a polarity of opposite sense and builds up to offset the effect of the original force voltage. This illustrates in general how a balance is established between rate of pitch and angle of attack.

An elevator control operation will now be described in particular. When the elevator is moved toward a dive position for example, the contact 124$a$ is lowered and the derived elevator potentiometer voltage representing pitching moment, assuming for example that the contact 124$a$ was originally in a climb position, first decreases in magnitude to the level flight indication and then reverses in polarity and increases in opposite magnitude thereby unbalancing the rate of pitch system and causing the motor 126 to operate in a direction to lower the contacts 127 and 128 as the system searches for a new balance position. When the contacts pass below the center or zero rate of pitch position indicating level flight, the derived voltages are of opposite instantaneous polarity from those in the climb position and the servo 121 of the pitch system which is energized from potentiometer 130, rotates now in the direction toward negative pitch (dive) thereby increasing the derived voltage at contact 122, i. e. the weight component ($-W \sin \theta$) to the $v$ system becomes positive and acts to increase air speed. The motor 111 of the $\alpha$ system, which receives a control signal from the companion potentiometer 129 now also rotates in the opposite direction toward negative α. This last operation causes the $C_M$ voltage fed to the rate of pitch system to become more positive thereby tending to stabilize said system. Concurrently, the movement of the servo has changed the $C_D$ potentiometer derived voltage at contact 113, thereby changing the drag input at the v system tending to modify the air speed reading.

Since a dive attitude represents negative pitch, the contacts 143 and 144 of the pitch potentiometer 142 are positioned beneath the respective ground taps to derive negative and positive voltages respectively. Thus the polarity at the terminals of angle of attack potentiometer 140 is reversed so that the polarity of the derived voltage is also reversed for operating the rate of climb servo in the negative or rate of dive direction. The resulting modified air speed voltage causes in turn modification of the derived voltages from the pitch potentiometer 142 and the angle of attack potentiometer 140 which represent the vertical components of air speed for energizing the rate of climb servo system. Thus, changes in angle of attack, pitch attitude and air speed are all reflected in the rate of climb reading at indicator 151. When the elevator control is relaxed for "flattening out" the dive, the rate of pitch servo is unbalanced by the decrease in the input voltage $M_D$ and operates in a direction to cause a more positive change or increase in both the centrifugal force voltage Fc and the rate of pitch voltage from potentiometers 129 and 130. Since these voltages tend to operate both the angle of attack and pitch servos toward more positive values, the air speed is not only decreased as above pointed out but the vertical components of air speed are reduced due to operation of the rate of climb servo toward neutral as the inputs thereof decrease.

Consequently there is a repetition of the interaction above described among the four servo systems until the air speed, angle of attack and dive attitude correspond to the aircraft power and elevator condition.

During the above described dive control operation the α system seeks a balance depending on the inputs representing respectively centrifugal force from the rate of pitch system and the gravity component from the pitch system on the one hand, and the lift coefficient from the changed angle of attack on the other hand, the resultant of these inputs operating the motor 111 in the positive or negative direction as the case may be and becoming balanced when the rate of pitch and the pitch systems become stabilized.

The above description of the operation of the air speed servo system, including operation of the air speed meter is intentionally simplified for the purpose of illustrating the interaction of the servo systems, each of which represents a certain flight condition or a system rotatable about a definite axis of the aircraft, such as the pitch axis for example.

In brief, the air speed meter reading and hence the vertical air speed and altitude readings in the system above described depends not only on the engine thrust component but also on retarding or modifying components that depend in turn on the angle of attack, rate of pitch and angle of pitch involving also the elevator control. A change in any one of the above factors or components necessarily affects the related systems generally tending to unbalance them so that in practice the complete system is continuously searching for a position of balance, thereby simulating the inherent aerodynamic equilibrium of aircraft.

During all these interactions of the servo systems on each other, the rate of climb servo responds and in so doing produces a voltage representing the second derivative of altitude of such sense or polarity as to oppose further change in flight path inclination and to stabilize the "aircraft" with respect to the so-called Y axis, i. e. the line passing through the center of gravity along the wings. In fact, this voltage tends to restore an equilibrium flight path condition, particularly in seeking a constant rate of climb by opposing any change in the rate of climb.

Though but a single embodiment illustrating the invention has been illustrated and described, it is to be understood that the invention may be applied in various forms. Changes may be made in the arrangements shown without departing from the spirit or scope of the invention as will be apparent to those skilled in the art and reference should be made to the appended claims for a definition of the limits of the invention.

I claim:
1. In flight simulating apparatus having simulated aircraft controls including throttle and elevator controls, flight computing means responsive to the operation of said controls and indicating instruments responsive to said computing means for representing flight conditions including vertical air speed and altitude, said computing means comprising a servo controlled potentiometer system jointly responsive to said controls for representing the air speed of the simulated flight, a servo controlled potentiometer system responsive to movement of the elevator control for representing a pitch condition, an additional servo controlled potentiometer system representing rate of climb jointly responsive to derived voltages from said air speed and pitch condition systems, said rate of climb system including potentiometer means energized according to the first derivative of rate of climb for deriving a stabilizing feedback control quantity for modifying the operation of said pitch condition system, and indicating means responsive to the operation of said rate of climb system for representing vertical air speed.

2. In flight simulating apparatus having simulated aircraft controls including throttle and elevator controls, flight computing means responsive to the operation of said controls comprising a plurality of inter-acting electrical systems and indicating means responsive to said computing means for representing flight conditions, said computing means comprising an electrical system responsive to the combined action of said controls for representing the air speed of the simulated flight, a second electrical system responsive to adjustment of the elevator control for representing a pitch condition, a third electrical system representing rate of climb responsive to the combined operations of said air speed and pitch condition systems, said third system including means for producing a voltage corresponding in sense and magnitude to the first derivative of rate of climb and means for modifying said voltage according to the value of rate of climb, said modified voltage being applied to said pitch condition system for stabilizing said system to simulate damping of an oscillatory mode of the aircraft, and indicating means responsive to said rate of climb system for representing vertical air speed.

3. In flight simulating apparatus having simulated aircraft controls, flight computing means responsive to the operation of said controls and indicating means responsive to said computing means for representing flight conditions including vertical air speed and altitude, said computing means comprising an interacting servo network including means responsive to the operation of simulated elevator control for representing a pitch condition, means responsive jointly to said controls for representing the air speed of the simulated flight, means jointly responsive to the operation of said air speed and pitch condition means representing angle of attack, means jointly responsive to said angle of attack means, said air speed means and said pitch condition means for representing rate of climb, said rate of climb means including deriving means for producing a feedback control quantity representing the first derivative of rate of climb for modifying and stabilizing the operation of said pitch condition means, and indicating means responsive to the operation of said rate of climb means for representing vertical air speed.

4. In flight simulating apparatus having simulated aircraft controls, flight computing means responsive to the operation of said controls and indicating instruments responsive to said computing means for representing flight conditions including vertical air speed and altitude, said computing means comprising an interacting servo network including means responsive to the operation of a simulated elevator control for representing a pitch condition, servo means responsive jointly to said controls for representing the air speed of the simulated flight, servo means jointly responsive to the operation of said air speed and pitch condition servo means representing angle of attack, servo means jointly responsive to said angle of attack means, said air speed means and said pitch condition means for representing rate of climb, said rate of climb means including voltage deriving means for producing a stabilizing feedback voltage representing the first derivative of rate of climb for modifying the operation of said pitch condition means, and indicating means responsive to the operation of said rate of climb means for representing vertical air speed.

5. Flight simulating apparatus for representing vertical speed of aircraft comprising voltage deriving means responsive to the operation of simulated aircraft controls affecting vertical air speed, an interrelated and interacting electrical system for computing flight conditions including vertical air speed and altitude responsive to said voltage deriving means, said system including interconnected units operable respectively to represent air speed, angle of attack, rate of pitch and pitch attitude and rate of climb, certain of said units including means for deriving voltages representing vertical components of air speed, said rate of climb unit being responsive to said component voltages for operating vertical air speed indicating means, and means responsive to the operation of said rate of climb means for deriving a potential representing the first derivative of rate of climb for stabilizing the operation of said rate of pitch unit.

6. Flight simulating apparatus for representing vertical speed of aircraft comprising voltage deriving means responsive to the operation of simulated aircraft controls affecting vertical air speed, an interrelated and interacting electrical system for computing flight conditions including vertical air speed and altitude responsive to said voltage driving means, said system including interconnected units operable respectively to represent air speed, angle of attack, rate of pitch and pitch attitude and rate of climb, said pitch and angle of attack units including potentiometer means for deriving voltages representing vertical components of air speed, said rate of climb unit including a servo motor jointly responsive to said component voltages for operating vertical air speed indicating means, and potentiometer means responsive to the operation of said rate of climb servo unit for deriving a potential representing the first derivative of rate of climb for stabilizing the operation of said rate of pitch unit.

7. In flight simulating apparatus having simulated aircraft controls, flight computing means responsive to the operation of said controls comprising means operable to represent change in airspeed, means operable to represent the aircraft attitude about the pitch axis, means responsive to said airspeed and pitch means for representing the aircraft vertical movement, said responsive means having means for deriving a control quantity representing the second derivative of the simulated flight altitude, and means for utilizing said control quantity to damp changes in said pitch representing means thereby simulating control of vertical stability with respect to the aircraft Y axis.

8. In flight simulating apparatus having simulated aircraft controls, electrical flight computing means responsive to the operation of said controls comprising servo means operable to represent change in airspeed, servo means operable to represent the aircraft attitude about the pitch axis, means jointly responsive to said airspeed and pitch means for representing the aircraft vertical movement, said responsive means having means for deriving a control voltage representing the second derivative of the simulated flight altitude, and servo means for utilizing said control voltage to damp changes in said pitch representing means thereby simulating control of vertical stability with respect to the aircraft Y axis.

9. In flight simulating apparatus having simulated aircraft controls including elevator and throttle controls, flight computing means responsive to the operation of said controls and indicating means responsive to said computing means for representing flight conditions including vertical airspeed and altitude, said computing means comprising a plurality of interacting electrical systems jointly responsive to said controls and constituting a "vertical system" for representing respectively the airspeed of the simulated flight, angle of attack, rate of pitch, rate of climb and pitch attitude, means controlled by the rate of climb system for deriving a stabilizing control voltage representing a first derivative function of vertical airspeed, said voltage being applied for input to the electrical system representing rate of pitch for stabilizing the aforesaid vertical system, and indicating means responsive to the operation of said rate of climb system for representing vertical airspeed.

10. In flight simulating apparatus having simulated flight controls, computing means responsive to the operation of said controls and indicating means responsive to said computing means for representing flight conditions including vertical airspeed, said computing means comprising means jointly responsive to said controls for representing the airspeed of the simulated flight, means responsive to movement of a vertical airspeed control for representing a pitch condition, and a servo system representing rate of climb responsive jointly to said airspeed and pitch condition means including a motor, means for producing a voltage representing in magnitude and sense the speed and direction of rotation respectively of said motor and means energized by said voltage and adjustable by said motor for deriving a voltage that is fed to the input of the aforesaid pitch condition means for vertical system stabilization.

11. In flight simulating apparatus having simulated flight controls, electric computing means responsive to the operation of said controls and indicating means responsive to said computing means for representing flight conditions including vertical airspeed, said computing means comprising means jointly responsive to said controls for representing the airspeed of the simulated flight, means responsive to movement of a vertical airspeed control for representing rate of pitch, and an electric servo system representing rate of climb responsive jointly to said airspeed and rate of pitch means including a motor, means associated therewith for generating a voltage representing in magnitude and sense the speed and direction of rotation respectively of said motor and potentiometer means energized by said voltage and adjustable by said motor for in turn deriving a stabilizing voltage that is fed to the input of the aforesaid rate of pitch means.

12. In aircraft flight simulating apparatus having simulated flight controls including a control for controlling pitch attitude, computing means responsive to the operation of said control comprising a plurality of inter-acting systems for computing the value of and producing in accordance with changes in said pitch attitude a plurality of variable control quantities representing flight factors, one of said systems being adapted to produce a control quantity representing a second time derivative acceleration factor, said control quantity in turn being applied to and modifying the operation of a second system representing a pitch condition, said pitch condition system thereby responding to simulate damping of an oscillatory mode of the aircraft, and flight condition indicating instruments controlled by said computing means.

13. In aircraft flight simulating apparatus having simulated flight controls including an elevator control for controlling pitch attitude, electrical computing means responsive to the operation of said elevator control comprising a plurality of inter-acting electrical systems for producing in accordance with changes in said pitch attitude a plurality of variable control voltages representing flight factors, one of said systems being adapted to produce a control voltage representing a second time derivative acceleration factor, said voltage in turn being applied to and modifying the operation of a second system representing a pitch condition, said pitch condition system thereby responding to simulate the damping of an oscillatory mode of the aircraft, and means controlled by said computing means for representing vertical airspeed and pitch attitude according to said oscillatory mode.

14. In aircraft flight simulating apparatus having simulated flight controls including an elevator control for controlling pitch attitude, electrical computing means responsive to the operation of said elevator control comprising a plurality of inter-acting electrical systems for producing in accordance with changes in said pitch attitude a plurality of variable control voltages representing flight factors, one of said systems representing rate-of-climb for producing one of said control voltages corresponding to a second time derivative acceleration factor, said control voltage in turn being applied to and modifying the operation of a second system representing rate-of-pitch, said rate-of-pitch system thereby responding to simulate the damping of an oscillatory mode of the aircraft, and means controlled by said computing means for representing vertical airspeed and pitch attitude.

References Cited in the file of this patent

UNITED STATES PATENTS

| 2,406,836 | Holden | Sept. 3, 1946 |
| 2,554,155 | Rippere | May 22, 1951 |
| 2,556,964 | Giroud | June 12, 1951 |